United States Patent
Chen et al.

(10) Patent No.: US 12,100,360 B2
(45) Date of Patent: Sep. 24, 2024

(54) BACKLIGHT MODULE AND DISPLAY DEVICE

(71) Applicant: Radiant Opto-Electronics Corporation, Kaohsiung (TW)

(72) Inventors: Jui-Lin Chen, Kaohsiung (TW);
Pin-Hsun Lee, Kaohsiung (TW);
Yuan-Jhang Chen, Kaohsiung (TW);
Che-Kai Chang, Kaohsiung (TW);
Chun-Hung Ho, Kaohsiung (TW);
Hung-Yi Chen, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/352,234

(22) Filed: Jul. 13, 2023

(65) Prior Publication Data
US 2023/0360611 A1     Nov. 9, 2023

Related U.S. Application Data

(63) Continuation of application No. PCT/CN2021/107747, filed on Jul. 22, 2021.

(51) Int. Cl.
*G09G 3/34* (2006.01)
*F21V 8/00* (2006.01)

(52) U.S. Cl.
CPC ......... *G09G 3/3406* (2013.01); *G02B 6/0023* (2013.01); *G02B 6/0036* (2013.01); *G02B 6/0073* (2013.01); *G02B 6/0081* (2013.01); *G09G 2320/06* (2013.01)

(58) Field of Classification Search
CPC ............. G09G 3/3406; G09G 2320/06; G09G 3/3426; G02B 6/0023; G02B 6/0036; G02B 6/0073; G02B 6/0081; G02F 1/133603; G02F 1/133607; G02F 1/133606; G09F 9/33
See application file for complete search history.

(56) References Cited

U.S. PATENT DOCUMENTS

2020/0363039 A1\* 11/2020 Chu .................. F21V 3/049
2020/0379162 A1    12/2020 Chen et al.

FOREIGN PATENT DOCUMENTS

| CN | 103444872 A | 12/2013 |
|---|---|---|
| CN | 206620213 U | 11/2017 |
| CN | 109407402 A | 3/2019 |
| CN | 110133916 A | 8/2019 |
| CN | 210348138 U | 4/2020 |
| CN | 111564119 A | 8/2020 |
| CN | 211979375 U | 11/2020 |
| CN | 211980636 U | 11/2020 |
| CN | 213277279 U | 5/2021 |

(Continued)

*Primary Examiner* — Abhishek Sarma
(74) *Attorney, Agent, or Firm* — CKC & Partners Co., LLC

(57) ABSTRACT

The present disclosure provides a backlight module and a display device. The backlight module includes a light source structure and an optical film. The light source structure includes a substrate, plural light-emitting units and a package structure. The light-emitting units are disposed on the substrate. The package structure covers the light-emitting units, and the package structure has plural convex portions. The optical film is disposed on the light source structure, and the optical film is in contact with the convex portions of the package structure.

5 Claims, 8 Drawing Sheets

(56) References Cited

FOREIGN PATENT DOCUMENTS

| | | |
|---|---|---|
| KR | 101553343 B1 | 9/2015 |
| TW | 201321670 A | 6/2013 |
| TW | I696018 B | 6/2020 |
| TW | 202036058 A | 10/2020 |

* cited by examiner

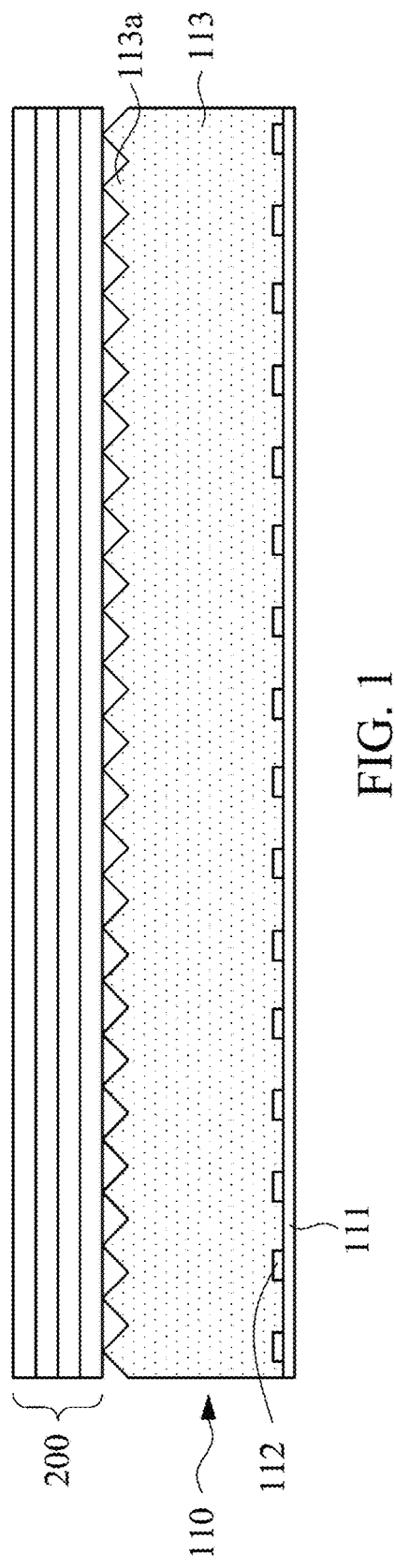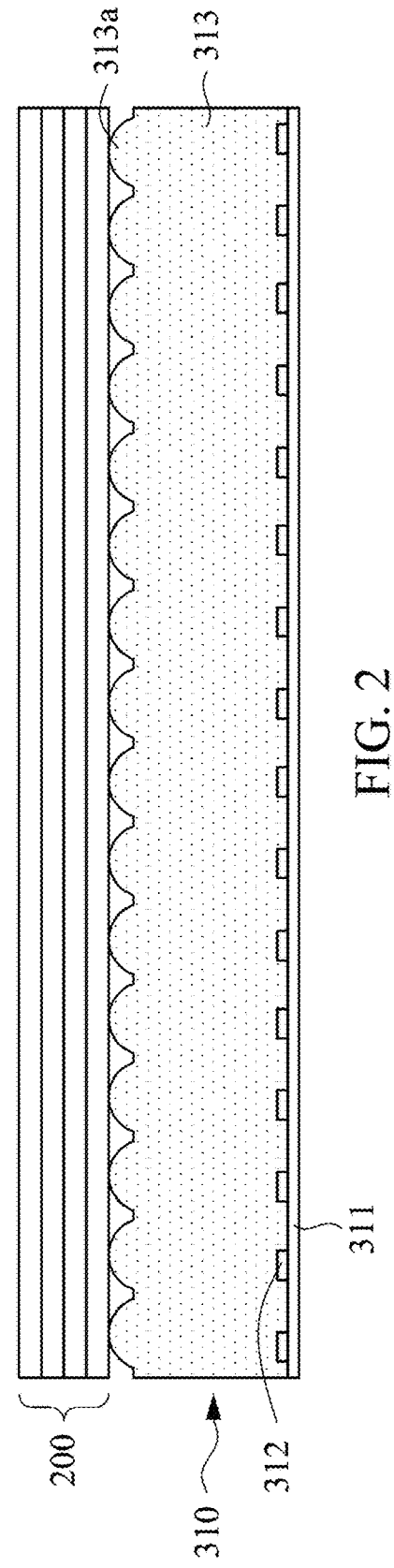

BACKLIGHT MODULE AND DISPLAY DEVICE

RELATED APPLICATIONS

This application is a continuation application of International Application No. PCT/CN2021/107747 filed on Jul. 22, 2021, which is herein incorporated by reference.

BACKGROUND

Field of Invention

The present disclosure relates to a light source module and its application, and more particularly, to a backlight module and a display device.

Description of Related Art

A light source generally used in a direct-type backlight module mainly includes a substrate, plural light-emitting diodes arrayed on the substrate and an encapsulant covering the light-emitting diodes. The light generated from the light-emitting diodes emits out of the encapsulant, the light will be further mixed by an optical film to form a surface light source.

However, besides the optical film, there are other components such as a display panel arranged above the encapsulant, so that a problem caused that the optical film above the encapsulant is adsorbed on a surface of the encapsulant often occurs, which seriously affects the appearance and the uniformity of the backlight module and the display device.

SUMMARY

Therefore, an objective of the present disclosure is to provide a backlight module and a display device. Through the design of the light source structure, the problems of the film in the backlight module and the display device being absorbed on the light source structure and affecting the appearance can be avoided.

According to the aforementioned objectives, the present disclosure provides a light source structure and an optical film. The light source structure includes a substrate, plural light-emitting units and a package structure. The light-emitting units are disposed on the substrate. The package structure covers the light-emitting units, and the package structure includes plural convex portions. The optical film is disposed on the light source structure, and the optical film is in contact with the convex portions of the package structure.

According to one embodiment of the present disclosure, the convex portions of the package structure are plural triangular prism structures, pyramidal prism structures or arcuate prism structures connected to each other.

According to one embodiment of the present disclosure, the package structure further includes plural of concave portions, and the convex portions and the concave portions are staggered arrangement.

According to one embodiment of the present disclosure, the light-emitting units are correspondingly disposed directly below the concave portions.

According to one embodiment of the present disclosure, the light-emitting units are correspondingly disposed directly below the convex portions.

According to one embodiment of the present disclosure, the light source structure further includes plural of partition walls disposed on the substrate, and the partition walls and the substrate jointly form plural accommodating spaces, and the light-emitting units are located in the accommodating spaces. The package structure includes plural package units, which are disposed in the accommodating spaces respectively and cover the light-emitting units. A height of a portion of the package units is greater than a height of each partition wall to form the convex portions, and a height of another portion of the package units is smaller than the height of each partition wall, and a height of still another portion of the package units is equal to the height of each partition wall.

According to one embodiment of the present disclosure, the package units whose height is greater than the partition walls, the package units whose height is smaller than the partition walls, and the package units whose height is equal to the partition walls are staggered arrangement.

According to one embodiment of the present disclosure, the light source structure further includes plural partition walls disposed on the substrate, and the partition walls and the substrate jointly form plural accommodating spaces, and the light-emitting units are located in the accommodating spaces. The package structure includes plural package units, which are disposed in the accommodating spaces respectively and cover the light-emitting units. Positions of the partition walls are located between adjacent two of the convex portions.

According to one embodiment of the present disclosure, a surface of each convex portions is a tension surface formed by capillarity.

According to the aforementioned objectives, the present disclosure provides a display device. The display device includes the aforementioned backlight module and a display panel. The display panel is disposed on the backlight module.

According to the aforementioned objectives, the present disclosure provides a display device. The display device includes the aforementioned backlight module and a display panel. The display panel is disposed on the backlight module. The heights of the package units corresponding to edges of the display panel are smaller than the height of each partition wall.

It can be known from the aforementioned description, the present disclosure mainly disposes the convex portions on the package structure of the light source structure for facilitating the uniformity of the light and solving the problem that the optical film is absorbed on the light source structure. On the other hand, the filling height of the package can also be adjusted according to the light-emitting requirement to improve the light uniformity of the backlight module and the display device.

BRIEF DESCRIPTION OF THE DRAWINGS

In order to make the above and other objectives, features, advantages, and embodiments of the present disclosure more comprehensible, the accompanying drawings are described as follows:

FIG. 1 is a schematic side view of a direct-type backlight module in accordance with a first embodiment of the present disclosure;

FIG. 2 is a schematic side view of a direct-type backlight module in accordance with a second embodiment of the present disclosure;

DETAILED DESCRIPTION

Figure 3:
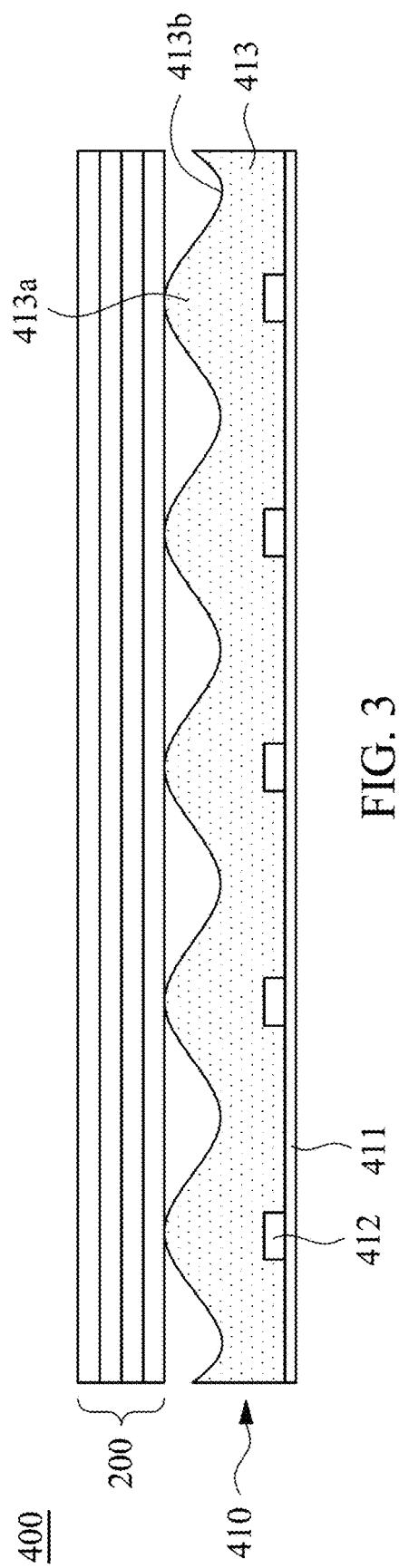
FIG. 3 is a schematic side view of a direct-type backlight module in accordance with a third embodiment of the present disclosure.

Referring to FIG. 1, which is a schematic side view of a direct-type backlight module in accordance with a first embodiment of the present disclosure. The backlight module 100 of the present embodiment includes a light source structure 110 and at least one optical film (for example, four optical films 200 in the figure). The optical films 200 are disposed on the light source structure 100, so that the light generated by the light source structure 110 can pass through the optical films 200 and emit out of the optical films 200.

Referring to FIG. 1, the light source structure 110 includes a substrate 111, plural light-emitting units 112 and a package structure 113. The light-emitting units 112 are disposed on the substrate 111. The package structure 113 covers the light-emitting units 112, and the package structure 113 includes plural convex portions 113a. The optical films 200 are disposed on the light source structure 110, and the optical films 200 are in contact with the convex portions 113a of the package structure 113. In the embodiment shown in FIG. 1, the convex portions 113a of the package structure 113 are plural triangular prism structures connected to each other. In this way, when the optical films 200 are disposed on the light source structure 110, the optical film 200 closest to the package structure 113 only contacts the convex portions 113a of the package structure 113, so that an air gap is formed between any two adjacent convex portions 113a and the optical film 200, thereby achieving the effect of preventing the optical film 200 from being absorbed on the package structure 113.

In the present disclosure, the convex portions of the package structure can also have different designs in shape. For example, as shown in FIG. 2, FIG. 2 is a schematic side view of a direct-type backlight module in accordance with a second embodiment of the present disclosure. The structure of the backlight module 300 shown in FIG. 2 is substantially the same as that of the backlight module 100 shown in FIG. 1, the difference is only that a light source structure 310 of the backlight module 300 has a different structural design. As shown in FIG. 2, the light source structure 310 includes a substrate 311, plural light-emitting units 312 and a package structure 313. The light-emitting units 312 are disposed on the substrate 311. The package structure 313 covers the light-emitting units 312, wherein the package structure 313 includes plural convex portions 313a. In this embodiment, the convex portions 313a of the package structure 313 are plural arcuate prism structures connected to each other. In this way, when the optical films 200 are disposed on the light source structure 310, the optical film 200 closest to the package structure 313 only contacts the convex portions 313a of the package structure 313, so that an air gap can also be formed between any two adjacent convex portions 313a and the optical film 200, thereby avoiding the problem that the optical film 200 is absorbed on the package structure 313. For clarification, in addition to the shapes of the embodiments shown in FIG. 1 and FIG. 2, the convex portions of the package structure can also be in other shapes, such as pyramidal structures, strip structures or granular structures, or, as shown in FIG. 3, a surface (a convex arc surface) of the convex portion 413a and a surface (a concave arc surface) of the concave portion 413b form a continuous sine wave surface on a section line, so that an air gap can be formed between the concave portion 413b and the optical film 200 when the optical films 200 disposed on the light source structure 410, and the optical film 200 closest to the package structure 413 only contacts the convex portions 413a of the package structure 413, thereby avoiding the problem that the optical film 200 is absorbed on the package structure 413.

In other embodiments of the present disclosure, the package structure can also be designed corresponding to the position arrangement of the light-emitting units. For example, as shown in FIG. 3, FIG. 3 is a schematic side view of a direct-type backlight module in accordance with a third embodiment of the present disclosure. The structure of the backlight module 400 shown in FIG. 3 is substantially the same as that of the backlight module 100 shown in FIG. 1, the difference is only that a light source structure 410 of the backlight module 400 has a different structural design. As shown in FIG. 3, the light source structure 410 includes a substrate 411, plural light-emitting units 412 and a package structure 413. The light-emitting units 412 are disposed on the substrate 411. The package structure 413 covers the light-emitting units 412, wherein the package structure 413 includes plural convex portions 413a and plural concave portions 413b.

As shown in FIG. 3, in this embodiment, the positions of the convex portions 413a and the concave portions 413b are staggered arrangement, and the light-emitting units 412 are directly disposed below the convex portions 413a correspondingly. That is to say, the convex portions 413a are located directly above the light-emitting units 412, and the concave portions 413b are disposed between any two adjacent light-emitting units 412. The light-emitting units 412 are arranged in an array, and the light at the positions directly above the light-emitting units 412 is higher than the light between any two adjacent light-emitting units 412. Therefore it can utilize the light divergent function of the convex portions 413a to disperse the light with higher intensity emitted from directly above the light-emitting units 412, and simultaneously utilize the concave portions 413b to guide the light to the dark area between any two adjacent light-emitting units 412, so that the light source structure 410 can provide the effect of uniform light.

Figure 4A:
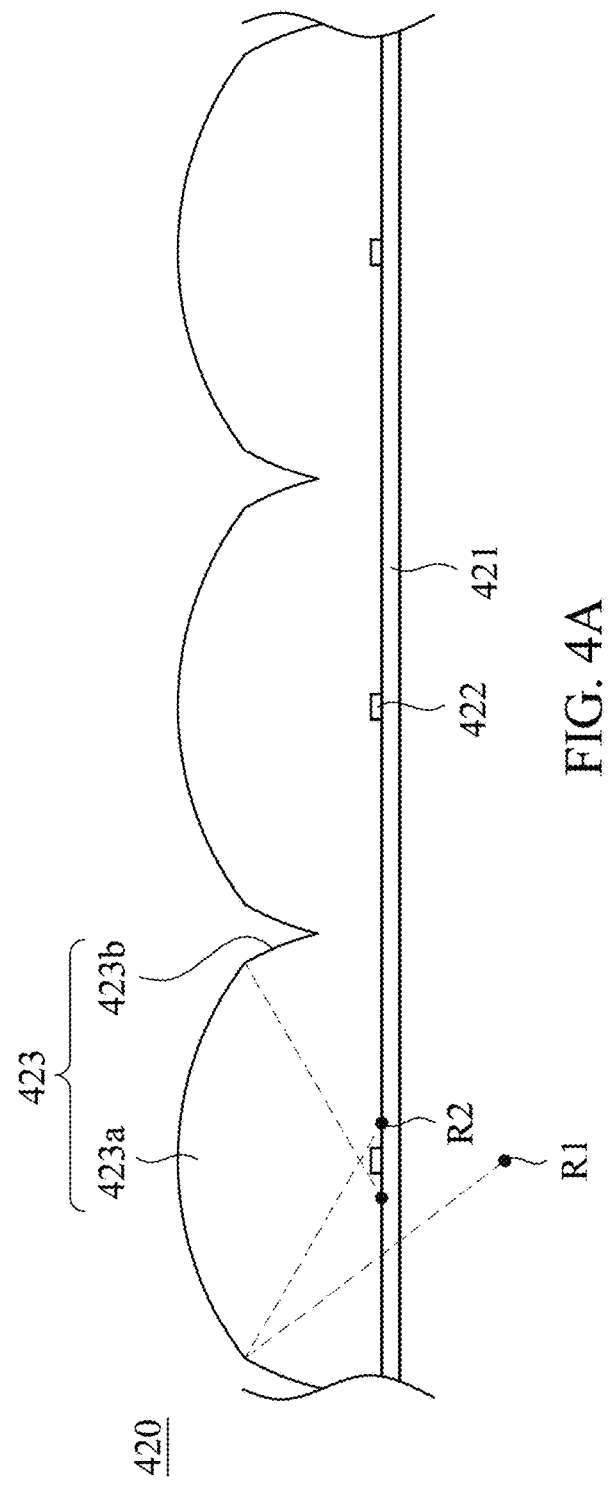
FIG. 4A is a partial side view of a light source structure in accordance with a fourth embodiment of the present disclosure.

In other embodiments, the convex portions and the concave portions of the package structure can have different shape designs. Referring to FIG. 4A, FIG. 4A is a partial side view of a light source structure in accordance with a fourth embodiment of the present disclosure. The structure of the light source structure 420 shown in FIG. 4A is substantially the same as that the light source structure 410 shown in FIG. 3, the difference is only that a package structure 423 of the light source structure 410 has a different shape design. As shown in FIG. 4A, the light source structure 420 includes a substrate 421, plural light-emitting units 422 and a package structure 423. The light-emitting units 422 are disposed on the substrate 421. The package structure 423 covers the light-emitting units 422, wherein the package structure 423 includes plural convex portions 423a and plural concave portions 423b. The light-emitting units 422 are correspondingly disposed below the convex portions 423a. As shown in FIG. 4A, the convex portion 423a in this embodiment has an arc surface drawn according to a first circle center R1, and the concave portion 423b has an arc surface drawn according to a second circle center R2. Based on the position of the light-emitting unit 422, the first circle center R1 is located on a side facing away from a light-emitting surface of the light-emitting unit 422. That is to say, the light-emitting unit 422 is located between the arc surface of the convex portion 423a and the first circle center R1. The second circle center R2 is located on a plane where the light-emitting unit 422 is located. For example, as shown in FIG. 4A, the second circle center R2 of the arc surface of the concave portion 423b, which is located at a left side of the light-emitting unit 422, is located at a right side of the light-emitting unit 422. Similarly, the second circle center R2 of the arc surface of the concave portion 423b, which is located at the right side of the light-emitting unit 422, is located at the left side of the light-emitting unit 422.

Figure 4B:
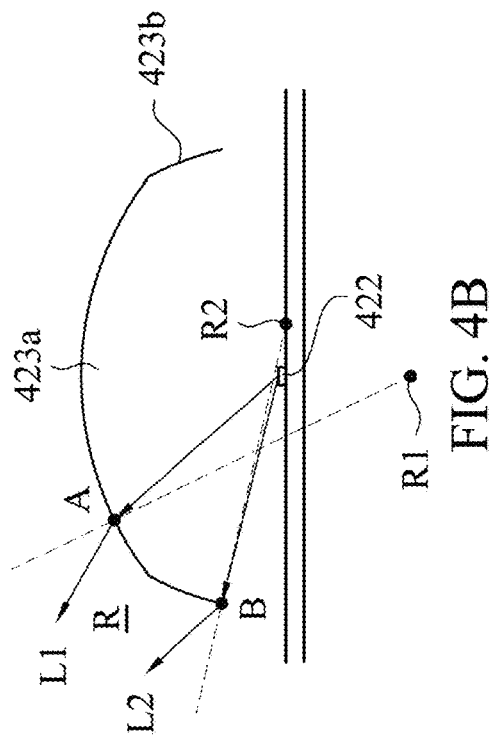
FIG. 4B and FIG. 4C are schematic diagrams showing a light emitting state of the light source structure in accordance with the fourth embodiment of the present disclosure.
Figure 4C:
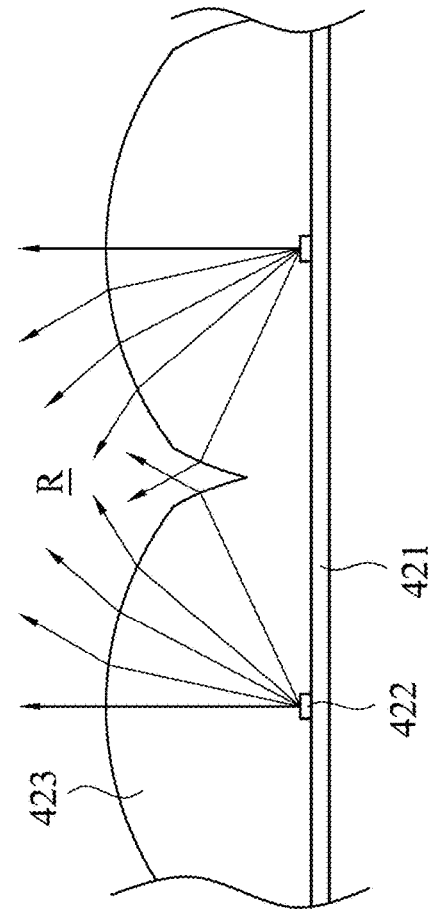

Referring to FIG. 4A to FIG. 4C, wherein FIG. 4B and FIG. 4C are schematic diagrams showing a light emitting state of the light source structure in accordance with the fourth embodiment of the present disclosure. Due to a refractive index of the package structure 423 is greater than a refractive index of air, so that the lights with smaller light-emitting angles are diverted toward directions deviated from the normal line, and the farther the lights are diverted from the normal line, the greater the deviation from the normal line when the lights are emitted when the lights of each light-emitting unit 422 are emitted from the convex portion 423a, except the light emitted along a direction parallel to an optical axis. Taking a point A on the convex portion 423a in FIG. 4B as an example, the light emitted by the light-emitting unit 422 enters from a lower right area relative to the normal line L1 and then exits from the upper left area relative to the normal line L1, so as to guide the light to an area R relative to the left side of the normal line L1. However, the light intensity of the light guided to the area R is not greater than the light intensity of the light directly above the LED, so that a dark area is easily generated in the area R.

In order to solve the problem of the dark area, when the light with a larger angle in each light-emitting unit 422 is emitted from the concave portion 423b, the light with the larger angle is also diverted toward a direction deviated from the normal line after passing through the normal line. Taking a point B on the concave portion 423b in FIG. 4B as an example, the light emitted by the light-emitting unit 422 enters from the lower left area relative to the normal line L2 and then exits from the upper right area relative to the normal line L2, so as to guide the light to the area R relative to at the right side of the normal line L2. Therefore, the concave portion 423b can further guide an oblique light emitted by each light-emitting unit 422 to the dark area R and moving closer to a light-emitting surface of the direct-type backlight module to reduce the number of the light-emitting units and achieve a good uniform light effect.

Figure 4D:
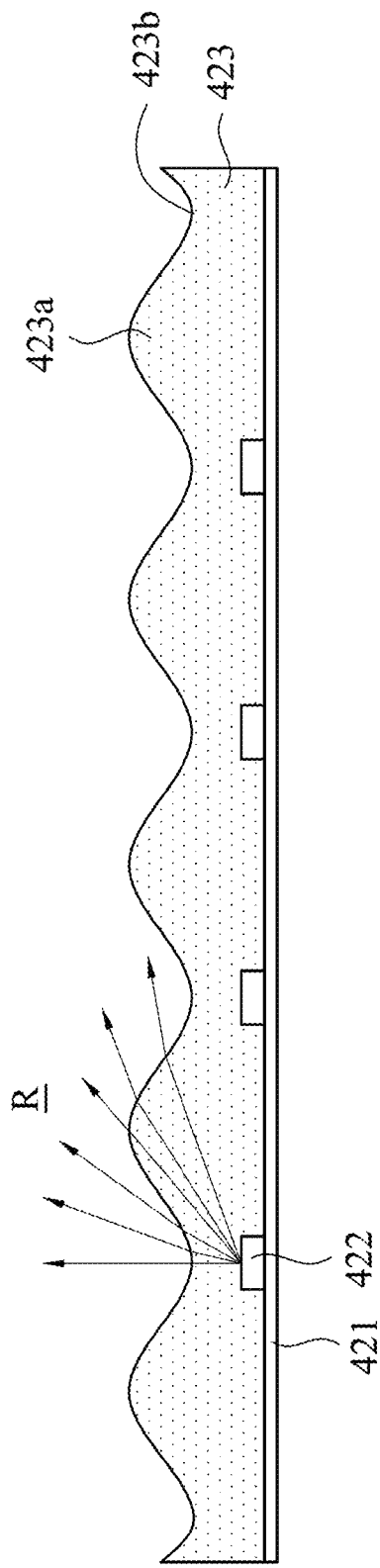
FIG. 4D is a schematic side view of another light source structure in accordance with the fourth embodiment of the present disclosure.

In another embodiment, as shown in FIG. 4D for example, the light-emitting units 422 can also be correspondingly disposed below the concave portions 423b instead of correspondingly disposed directly below the convex portions 423a, and it can utilize the air gap formed between any two adjacent convex portions 423a and the optical film 200 to solve the problem of absorption. In addition, the light-emitting angle directly above the light-emitting unit 422 is constant, and the other lights are emitted toward the dark area R between any two adjacent peripheral light-emitting units 422 to achieve a good uniform light effect.

Figure 5:
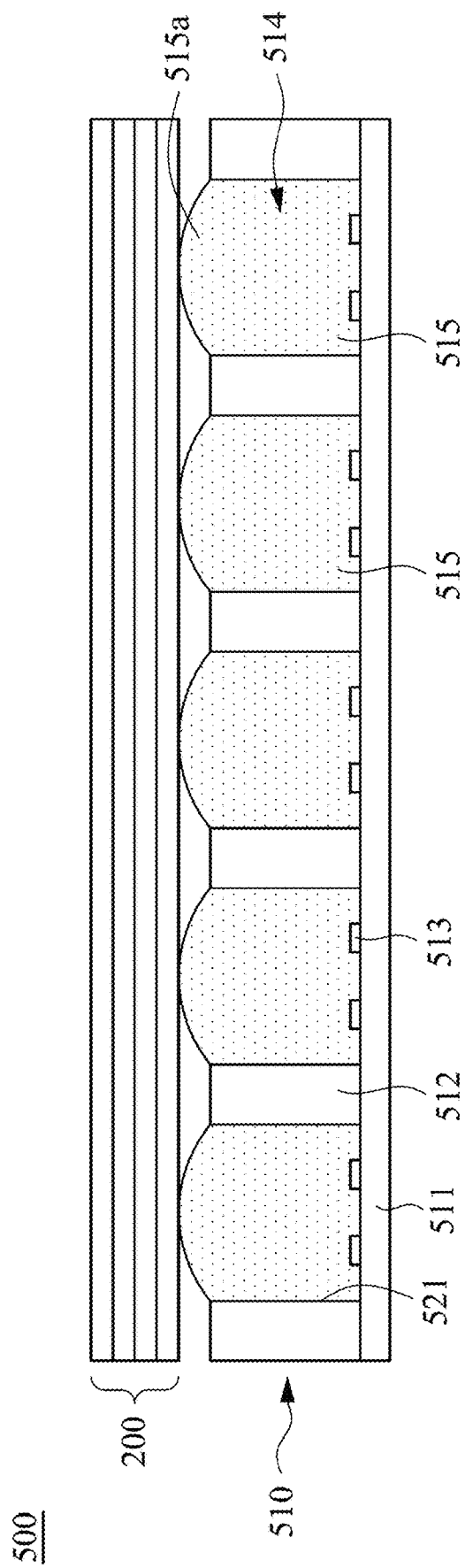
FIG. 5 is a schematic side view of a direct-type backlight module in accordance with a fifth embodiment of the present disclosure.

In the present disclosure, the light source structure can have different structural designs. Referring to FIG. 5, FIG. 5 is a schematic side view of a direct-type backlight module in accordance with a fifth embodiment of the present disclosure. The structure of the backlight module 500 in this embodiment is substantially the same as that the backlight module 100 shown in FIG. 1, the difference is only that a light source structure 510 of the backlight module 500 has a different structural design. As shown in FIG. 5, the light source structure 510 includes a substrate 511, plural partition walls 512, plural light-emitting units 513 and a package structure 514. The partition walls 512 are disposed on the substrate 511, and the partition walls 512 and the substrate 511 jointly form plural accommodating spaces 521. The light-emitting units 513 are disposed on the substrate 311 and located in the accommodating spaces 521. For example, in the present disclosure, each accommodating space 521 may preferably include an array of N*N light-emitting units 513. In the present embodiment, each accommodating space 521 is provided with four light-emitting units 513 (i.e., 2*2 light emitting units 513), but not limited thereto. In other embodiments, the number of the light-emitting units 513 in each accommodating space 521 can be determined according to the requirements.

As shown in FIG. 5, the package structure 514 includes plural package units 515, which are disposed in the accommodating spaces 521 respectively and cover the light-emitting units 513. The height of the package unit 515 is greater than the height of the partition wall 512, and the portion of the package unit 515 greater than the height of a top end of the partition wall 512 is the convex portion 515a. In this embodiment, a surface of the convex portion 515a of each package unit 515 is a tension surface formed by capillarity. Therefore, when the optical films 200 are disposed on the light source structure 510, the optical film 200 closest to the package structure 514 only contacts the convex portions 515a of the package units 515, so that an air gap can be formed between the top end of the partition wall 512 and the optical film 200, thereby the problem of the absorption of the optical film 200 on the package structure 514 can be avoided. On the other hand, the convex portion 515a provides the light divergent function to disperse the light to a top of the partition wall 512, so as to compensate the light to an area above the partition wall 512 with relatively low luminance. Further, the light uniformity of the overall light source structure 510 is improved.

Figure 6A:
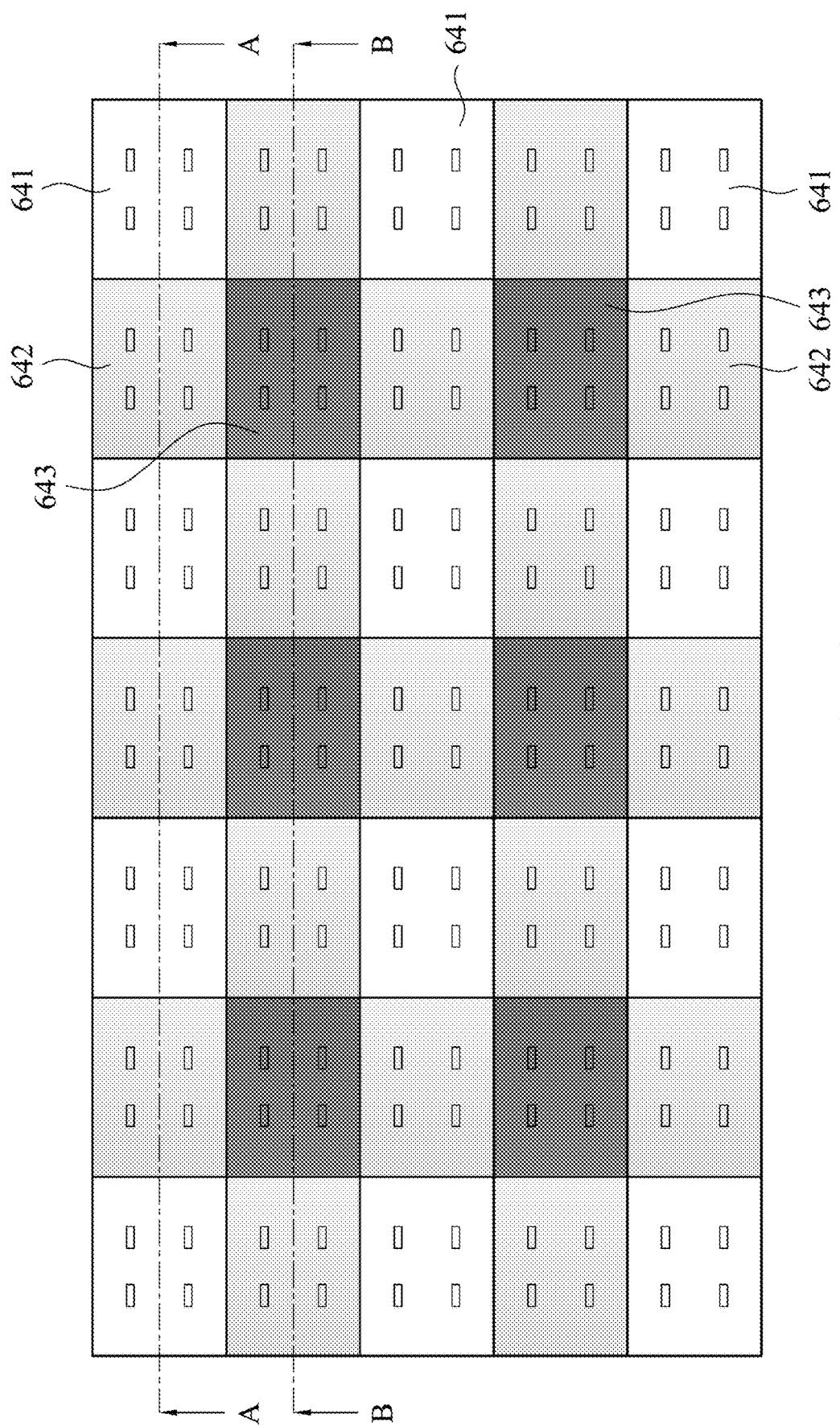
FIG. 6A is a top view of a light source structure in accordance with a sixth embodiment of the present disclosure.
Figure 6B:
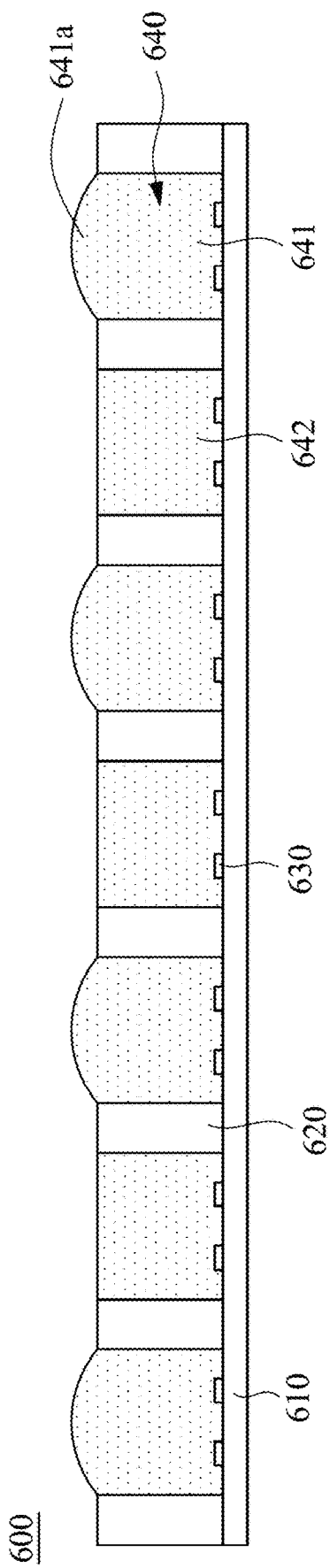
FIG. 6B is a schematic cross-sectional view taken along a line A-A in FIG. 6A.
Figure 6C:
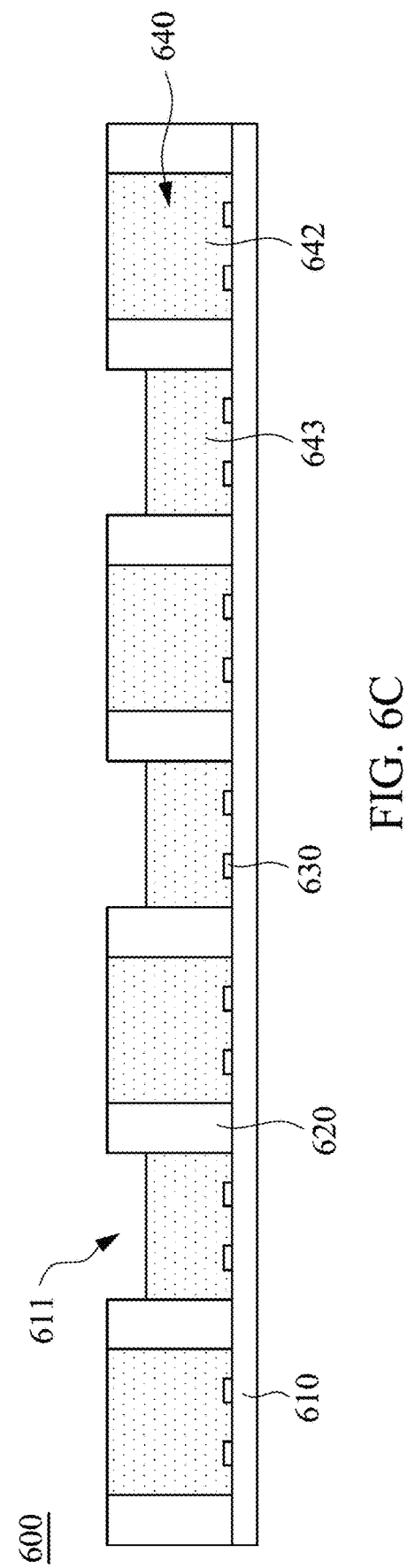
FIG. 6C is a schematic cross-sectional view taken along line B-B in FIG. 6A.

Referring to FIG. 6A, FIG. 6B and FIG. 6C simultaneously, FIG. 6A is a top view of a light source structure in accordance with a sixth embodiment of the present disclosure, FIG. 6B is a schematic cross-sectional view taken along a line A-A in FIG. 6A, FIG. 6C is a schematic cross-sectional view taken along a line B-B in FIG. 6A. In this embodiment, the light source structure 600 includes a substrate 610, plural partition walls 620, plural light-emitting units 630 and a package structure 640. The partition walls 620 are disposed on the substrate 610, and the partition walls 620 and the substrate 610 jointly form plural accommodating spaces 611. The light-emitting units 630 are disposed on the substrate 610 and located in the accommodating spaces 611. In an embodiment, the package structure 640 includes plural package units (such as a package unit 641, a package unit 642 and a package unit 643), and the package unit 641, the package unit 642 and the package unit 643 are disposed in the accommodating spaces 611 and cover the light-emitting units 630.

As shown in FIG. 6B and FIG. 6C, the height of the package unit 641 is greater than the height of the partition wall 620, and the portion of the package unit 641 greater than the height of the top end of the partition wall 620 is the convex portion 641a. The height of the package unit 642 is equal to the height of the partition wall 620. The height of the package unit 643 is smaller than the height of the partition wall 620. In this embodiment, the positions of the package unit 641 whose height is greater than the partition wall 620, the package unit 643 whose height is smaller than the partition wall 620, and the package unit 642 whose height is equal to the partition wall 620 are staggered arrangement. In some application examples, the heights of the package unit 641, the package unit 642 and the package unit 643 can be designed according to the actual requirements, so that the luminance of the light-emitting units 630 can be adjusted by changing the heights of these package units, and the alternate design of the heights of the package units can ensure that the optical film 200 is uniformly supported by the convex portions 641a. When the optical films 200 shown in FIG. 5 are disposed on the light source structure 600, the optical film 200 closest to the package unit 641 only contacts the convex portion 641a of the package unit 641, so that an air gap can be formed between the top end of the partition wall 620 and the optical film 200, thereby avoiding the problem that the optical film 200 is absorbed on the package structure 640. On the other hand, it can utilize the light divergent function of the convex portions 641a of the package unit 641 to disperse the light with higher intensity emitted from directly above the light-emitting units 630, and at the same time, it can utilize the package unit 643 whose height is smaller than that of the partition wall 620 to guide the light to transmit to the dark area and emit toward a forward direction, so that the effect of uniformizing the light generated by the overall light source structure 510 can be achieved.

Figure 7:
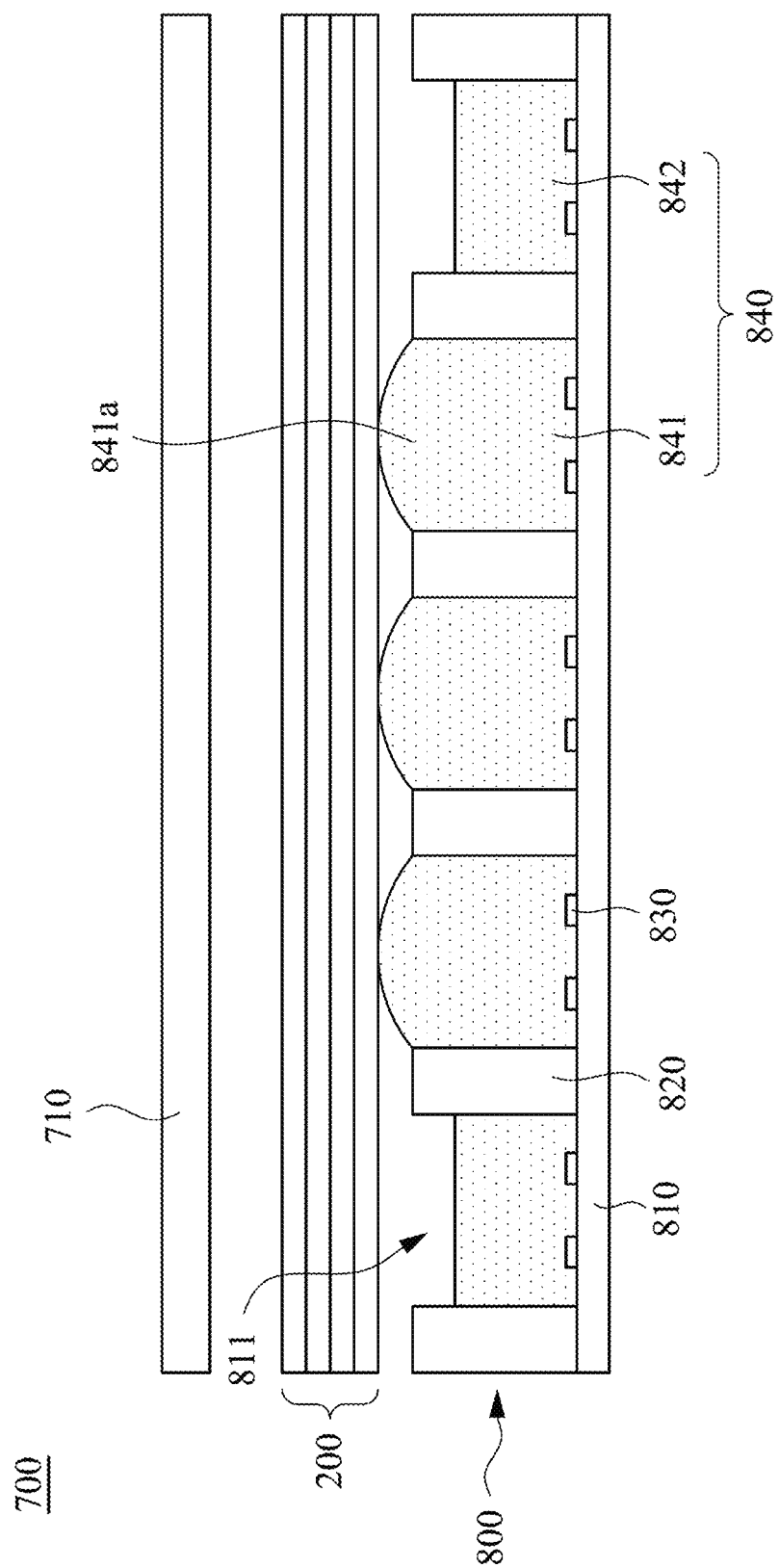
FIG. 7 is a schematic side view of a display device in accordance with an embodiment of the present disclosure.

Referring to FIG. 7, FIG. 7 is a schematic side view of a display device in accordance with an embodiment of the present disclosure. In this embodiment, the display device 700 mainly includes a backlight module formed by a light source structure 800 and optical films 200, and a display panel 710 disposed over the optical films 200. The structure of the light source structure 800 is substantially the same as that of the light source structure 510 shown in FIG. 5, and the difference is only that the package structure 840 of the light source structure 800 has a different structural design. As shown in FIG. 7, the light source structure 800 includes a substrate 810, plural partition walls 820, plural light-emitting units 830 and a package structure 840. The partition walls 820 are disposed on the substrate 810, and the partition walls 820 and the substrate 810 jointly form plural accommodating spaces 811. The light-emitting units 830 are disposed on the substrate 810 and located in the accommodating spaces 811.

As shown in FIG. 7, the package structure 840 includes plural package units (such as a package unit 841 and a package unit 842). The height of the package unit 842 is smaller than that of the partition wall 820, therefore the blue appearance effect will be less likely happened due to less the package unit 842. The package unit 842 is correspondingly disposed on the edge of the display panel 710. The height of the package unit 841 is greater than that of the partition wall 820, and the portion of the package unit 841 greater than the height of the top end of the partition wall 820 is the convex portion 841a. The problem that the optical film 200 is absorbed on the light source structure 800 can be avoided by the design of the package unit 841 and the package unit 842, and the problem that a blue border shows on an edge on a display area can also be solved by the package unit 842 correspondingly disposed on the edge of the display panel 710. For clarification, if there is no blue border problem on the edge of the display area, it is not necessary to design the package unit 842 whose height is smaller than that of the partition wall 820, and it can directly use the light source structure 510 shown in FIG. 5. On the other hand, the embodiment shown in FIG. 7 is illustrated by taking the light source structure 800 as an example, but it is not intended to limit the present invention. The light source structures of the aforementioned embodiments (such as the light source structure 110 shown in FIG. 1, the light source structure 310 shown in FIG. 2, the light source structure 410 shown in FIG. 3, the light source structure 510 shown in FIG. 5, and the light source structure 600 shown in FIG. 6A) all can be applied in the display device to generate the same effect.

It can be known from the aforementioned embodiments of the present disclosure, the present disclosure mainly disposes the convex portions on the package structure of the light source structure for facilitating the uniformity of the light and solving the problem that the optical film is absorbed on the light source structure. On the other hand, the filling height of the package can also be adjusted according to the light-emitting requirement to improve the light uniformity of the backlight module and the display device.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:
1. A backlight module, comprising:
a light source structure comprising:
    a substrate;
    a plurality of light-emitting units disposed on the substrate; and
    a package structure covering the light-emitting units, wherein the package structure comprises a plurality of convex portions; and
an optical film disposed on the light source structure, wherein the optical film is in contact with the convex portions of the package structure;
wherein the light source structure further comprises a plurality of partition walls disposed on the substrate, wherein the partition walls and the substrate jointly form a plurality of accommodating spaces, and the light-emitting units are located in the accommodating spaces;
the package structure comprises a plurality of package units disposed in the accommodating spaces respectively and covering the light-emitting units;
a height of a portion of the package units is greater than a height of each of the partition walls to form the convex portions, and a height of another portion of the package units is smaller than the height of each of the partition walls, and a height of still another portion of the package units is equal to the height of each of the partition walls; and wherein the package units whose height is greater than the partition walls, the package units whose height is smaller than the partition walls, and the package units whose height is equal to the partition walls are staggered arrangement.

2. The backlight module of claim 1, wherein the convex portions of the package structure are a plurality of triangular prism structures, pyramidal prism structures or arcuate prism structures connected to each other.

3. The backlight module of claim 1, wherein the package structure further comprises a plurality of concave portions, and the convex portions and the concave portions are staggered arrangement.

4. The backlight module of claim 1, wherein a surface of each of the convex portions is a tension surface formed by capillarity.

5. A display device, comprising:
a backlight module of claim 1; and
a display panel disposed on the backlight module.

* * * * *